United States Patent Office 3,414,591
Patented Dec. 3, 1968

3,414,591
NOVEL METHOD FOR PRODUCING 9β,10α-6-METHYLENE TESTOSTERONE
Harmen van Kamp, Van Houtenlaan, Weesp, Netherlands, assignor to North American Philips Company, Inc., New York, N.Y., a corporation of Delaware
No Drawing. Filed July 9, 1965, Ser. No. 470,913
Claims priority, application Great Britain, Apr. 9, 1965, 15,186/65
1 Claim. (Cl. 260—397.4)

ABSTRACT OF THE DISCLOSURE

Produce 3 - keto - 4 - dehydro - 6 - trihalomethyl 9β,10α steroid of the androstane series by treating corresponding 3-hydrogen compound with enolalkylating compound and then with trihalomethane without separation of the 3-enolether intermediate. Further the resultant 3-keto-4-dehydro-6-trihalomethyl 9β,10α steroid is converted to the corresponding 6 methylene compound by treatment with chromous chloride in the presence of hydrochloric acid. This abstract is not intended to be a description of the invention defined by the claims.

My invention relates to a novel method of producing 3-keto-4-dehydro-6-trihalogenomethyl - 9β,10α - steroids and to a method of converting the latter group of steroids into the corresponding 6-methylene-9β,10α-steroids. 3-keto-4-dehydro-6-trichloromethyl and the corresponding 6-tribromomethyl-9β,10α-steroids having at carbon atom 17 a hydroxyl-, acyloxy- or alkoxy group in β-position and at this carbon atom in α-position a hydrogen atom or a methyl, vinyl, an ethyl or an ethynyl group form the subject matter of copending application U.S. Ser. No. 470,871, filed July 9, 1965 now abandoned of which I am co-inventor.

The underlying invention relates to a novel method of producing these 6-trichloro- or 6-tribromo-methyl 9β, 10α-steroids. This novel method has the advantage of giving relatively high yields of the desired end-product. Another advantage of this process is that it can be carried out rather easily and that no isolation of intermediately formed intermediates is necessary.

The invention consists in a method of producing a compound of the formula

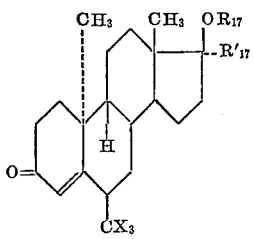

in which formula
CX₃ represents a trichloromethyl or a tribromomethyl group
OR₁₇ is hydroxy or an acyloxy or alkoxy group and
R'₁₇ is a hydrogen atom or a methyl, an ethyl, a vinyl or an ethynyl group, by reacting a compound of the formula

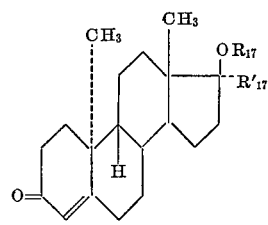

in which Formula OR₁₇ and R'₁₇ have the aforesaid meaning with an enolalkylating agent to produce a 3-alkoxy - 3,5-bisdehydro-9β,10α-steroid, which compound without intermediate purification or isolation is reacted with tetrabromomethane or trichloromonobromomethane in the presence of a tertiary amine and, if desired in the presence of reaction catalysts.

A suitable enolalkylating agent is for example an alkylorthoformate in a medium of dioxan or benzene to which medium catalytic amounts of β-toluene sulphonic acid have been added. As alkylortho formate use may be made of ethylorthoformate. Tertiary amines, which are used to bind hydrobromic acid as formed during the reaction between the enolether and tetrabromomethane or trichloromonobromomethane, are for example pyridine, collidine, or N,N-diethyl (or -dimethyl)-aniline.

As a reaction catalyst use may be made of peroxides e.g. benzoyl peroxide. Further it is of advantage to have the introduction of a trichloromethyl group taken place in the presence of light such as direct sunlight. Another part of my invention consists in converting 6-tribromo (or trichloro)-methyl-9β,10α-steroids as aforesaid into the corresponding 6-methylene compounds, which compounds form part of the subject matter of application U.S. Ser. No. 470,894 filed July 9, 1965 now abandoned of which I am co-inventor. 6-methylene-steroids may be prepared according to the so-called "Vilsmeyer" reaction.

According to this reaction a 3-alkoxy-3,5-diene-steroid is reacted with dimethylformamide and phosgene. After hydrolysis of an intermediately produced iminium compound the corresponding 6-formal-3-alkoxy-3,5-diene is produced.

By catalytic reduction or by reduction with sodium- or lithium borohydride the corresponding 6-hydroxymethyl-3-alkoxy-3,5-diene is obtained. Subsequent treatment of the latter compound with aqueous diluted acid results into hydrolysis of the enolether group and simultaneously of dehydration of the 6-hydroxymethyl group. Preferably this reaction is carried out in a medium of aqueous diluted acetic acid or hydrochloric or sulphuric acid in a medium of a lower alkanol, e.g. methanol.

I have found that introduction of a 6-methylene group may be carried out in a more simple way by reacting a 6-trihalomethyl-9β,10α-steroid with chromous chloride in the presence of hydrochloric acid. This reaction gives high yields of the desired 3-keto-4-dehydro-6-methylene-9β,10α-steroids. Such compounds are disclosed in United States application Ser. No. 470,894, filed July 7, 1965 of which I am a co-inventor.

This part of my invention consists in a method of producing 3-keto-4-dehydro-6-methylene-9β,10α-steroids which reaction is characterized by reacting a compound of the formula

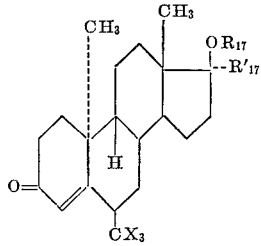

in which formula

OR$_{17}$ represents hydroxy or an acyloxy or alkoxy group in β-position and R'$_{17}$ is a hydrogen atom, a methyl, an ethyl, a vinyl or an ethynyl group in α-position and —CX$_3$ is a trichloromethyl or a tribromomethyl group, with chromouschloride in the presence of hydrochloric acid.

A suitable medium for carrying out the reaction consists of a mixture of ethanol and tetrahydrofuron.

The hydrogen atoms or methyl groups at the carbon atoms 8, 9, 10, 13 and 14 of the steroids used in my inventive processes have the same stereo chemical configurations as the corresponding hydrogen atoms and methyl groups in dihydroiso-lumisterone. Castells et al., Proc. of the Chemical Soc. Jan., 1958, p. 7, have shown that dihydroisoluministerone has the configuration 8β, 9β, 10α-methyl, 13β-methyl, 14α.

The expression 9β,10α is used in this application to indicate at which carbon atoms (9 and 10) the stereochemical configuration deviates from the one of the normal steroids and in which sense (9β,10α in contra distinction to the 9α, 10β-configuration of the normal steroids.

In this application the β-configuration of a hydrogen atom, a methyl group or of an other substituent not bound to a unsaturated carbon atom is indicated by a solid line. A dotted line represents the α-configuration. The expressions "alkoxy" and "acyloxy" used in this application have the following meaning: "Alkoxy" alkoxy group containing 1–10 carbon atoms. The alkyl part of the alkoxy group is preferably an aliphatic, alicyclic, mixed aliphatic-aromatic or mixed aliphatic-alicyclic group. Examples of alkoxy are: methoxy-, ethoxy-, propoxy-, tert·butoxy-, cyclopentyloxy-, cyclohexyloxy and benzyloxy, methylcyclopentyloxy;

"Acyloxy": acyloxy group containing from 1–20 carbon atoms. The acyl part of the acyloxy group is preferably the acyl group of saturated or unsaturated aliphatic mono-, di- or tricarboxylic acid, mixed aliphatic-aromatic carboxylic acid, aromatic carboxylic acid, saturated or unsaturated or alicyclic- or mixed aliphatic- alicyclic monocarboxylic acid, especially those having from 1–6 carbon atoms. Examples of acyloxy groups are: formoxy-, acetoxy-, propionoxy-, butyroxy-, acyloxy groups of oleic acid, palmitic acid, stearic acid, enanthocic acid, undecyloic acid, caproic acid, pivalic acid, succinic acid, malonic acid, citric acid, benzoic acid and p-hexyloxyphenyl propionic acid, hexahydrobenzoic acid, phenylacetic acid, β-cyclopentylpropionic acid, β-cyclohexylpropionic acid.

Example 1.—6β-tribromomethyl-17β-hydroxy-9β,10α-androst-4-en-3-one 17-acetate

To a solution of 6 g. of 17β-hydoxy-9β,10α-androst-4-en-3-one 17-acetate in 75 ml. of dry, freshly distilled dioxan, 4.1 ml. of ethyl orthoformate and 100 mg. of p-toluenesulfonic were added. The mixture was allowed to stand in a well-closed vessel at room temperature for 48 hours, in which time the enoletherification was mostly completed. The conversion into the 3-enol-ether was checked by means of thin-layer chromatography (benzene+2% of acetone+~0.1% of pyridine). In the case the conversion was not nearly complete, the mixture was after the addition of 1.5 ml. of ethyl orthoformate, kept at room temperature for an additional period of 24 hours. To the solution were then added 2.9 ml. of pyridine and 18.1 g. of tetrabromomethane. The mixture was allowed to stand in diffuse daylight at room temperature for 10 days. The crystalline precipitate was filtered off and the filtrate was after dilution with methylene chloride, washed with water, 2 N sulfuric acid, water, 5%, sodium bicarbonate solution and finally with water. After drying and evaporation of the solvents, the residue was triturated with ether, to give 7.2 g. of 6β-tribromomethyl-17β-hydroxy-9β,10α-androst-4-en-3-one 17 acetate. An analytical sample was obtained by chromatography on silicagel (elution with methylene chloride), M.P. 180° (Kofler); [α]$_D^{25}$=−68.5°; ε240 Nm.=13 700; I.R. 725, 742, 871, 877, 1031, 1048, 1253, 1374, 1612, 1674 and 1730 cm.$^{-1}$; N.M.R. 0.87/s.(3) CH$_3$-18; 1.38/s.(3) CH$_3$-19; 2.03/s. (3) CH$_3$-Ac; 3.36/dm./J=11 c./s.(1) CH-6; 4.70/m.(1) CH-17; 5.27/s. CH$_2$Cl$_2$; 6.38/d./J=1 c./s.(1) CH-4.

Example 2.—6β-trichloromethyl-17β-hydroxy-9β,10α-androst-4-en-3-one 17-acetate

This compound was prepared from 17β-hydroxy-9β,10α-androst-4-en-3-one 17-acetate according to the same method as in Example 1. However tetrabromomethane was replaced by tetrachloromethane. Yield 65%; M.P. 177.5–178° [α]$_D^{25}$=−97.5°; ε 238 Nm.=14,300; I.R. 780, 865, 882, 1027, 1046, 1242, 1610, 1685 and 1745 cm.$^{-1}$; N.M.R. 0.88/s.(3) CH$_3$–18; 1.39/s.(3) CH$_3$–19; 2.05/s.(3) CH$_3$–Ac; 3.37/dm./J=12 c./s.(1) CH–6: 4.72/m.(1) CH–17; 6.31/d./J=1 c./s.(1) CH–4.

6β-trichloromethyl-9β,10α-pregn-4-ene-3,20-dione

From 9β,10α-pregn-4-ene-3,20-dione, yield 50%; M.P. 205.5–206.5°; [α]$_D^{25}$=37.5°; ε238 Nm.=13,900; I.R. 776, 787, 868, 878, 1363, 1617, 1679 and 1701 cm.$^{-1}$.

Example 3.—6-methylene-17β-hydroxy-9β,10α-androst-4-en-3-one 17-acetate

A solution of 3.7 g. of 6β-trichloromethyl-17β-hydroxy-9β,10α-androst-4-en-3-one 17-acetate prepared as described in Example 2 in 100 ml. of tetrahydrofuran was treated at room temperature with a chromous chloride solution (prepared from 24 g. of chromic chloride in 175 ml. of ethanol and 35 ml. of conc. hydrochloric acid, and 20 g. of zinc) in a nitrogen atmosphere. The mixture was stirred for 40 min., poured into water and extracted with methylene chloride. The extract was washed with water, a 5% sodium bicarbonate solution and water. After drying and evaporation of the solvents, the residue was chromatographed on silicagel to yield after recrystallization from ether 1.71 g. of 6-methylene-17β-hydroxy-9β, 10α-androst-4-en-3-one 17-acetate with M.P. 140–141°; ε255 Nm.=9,780; I.R. 871, 875, 905, 1025, 1042, 1247, 1605, 1630 (sh.), 1670, 1740, 1815, 3030 and 3080 cm.$^{-1}$. N.M.R. 0.88/s.(3ρ CH$_3$–18; 1.27/s.(3) CH$_3$–19; 2.04/s. (3) CH$_3$–Ac; 4.67/m.(1) CH–17; 4.91/d.(1), 5.04/d. (1)=CH$_2$–6; 5.83/s.(1) CH–4.

Example 4.—6β-trichloromethyl-17β-hydroxy-17-methyl-9β,10α-androst-4-en-3-one 17-acetate 17β-hydroxy-9β,10α-androst-4-en-3-one was converted into a corresponding 3-enamino-3,5-bisdehydro-9β,10α-steroid. This compound was oxidized to produce 3-enamino-9β,10α-androsta-3,5-dien-17-one which latter compound was reacted with methyl-magnesiumbromide which reaction after hydrolysis resulted in formation of 17-methyl-17β-hydroxy-9β,10α-androst-4-en-3-one. This compound was esterified with acetylchloride and some pyridine to produce the corresponding 17-acetate.

The 17-acetate was converted into 6β-trichloromethyl-17β-hydroxy-17-9β,10α-androst-4-en-3-one 17-acetate by the method described in Example 1 using however tetrachloromethane instead of tetrabromomethane. M.P. 188.5–189.5°; ε 238.5 Nm.=14,350; [α]$_D^{25}$ =−99°. I.R. 657, 683, 780, 879, 1016, 1037, 1268, 1410, 1610, 1675 and 1725 cm.$^{-1}$. N.M.R. 0.95/s. (3) CH$_3$—18; 1.40/s. (3) CH$_3$—19; 1.51/s. (3) CH$_3$—17; 198/s. (3)

CH$_3$—Ac 3.37/dm./J=12 c./s. (1) CH—6; 6.31/d./J=1 c./s. (1) CH—4.

What is claimed is:
1. A method of producing 3-keto-4-dehydro-6 methylene-9β,10α-steroids comprising reacting a compound of the formula

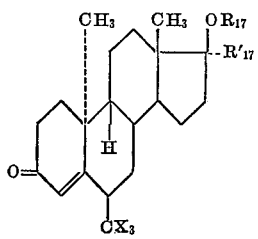

wherein OR$_{17}$ is a moiety selected from the group consisting of hydroxy, acyloxy of 1–20 carbon atoms and alkoxy group in β position and R'$_{17}$ is moiety selected from the group consisting of a hydrogen atom, methyl, ethyl, vinyl and ethynyl in α-position and —CX$_3$ is a member of the group consisting of trichloromethyl an tribromomethyl, with chromous chloride in the presence of hydrochloric acid.

References Cited

UNITED STATES PATENTS 3,198,792  8/1965  Reerink et al. _____ 260—239.55
3,222,383  3/1961  Godtfredsen _____ 260—397.4

ELBERT L. ROBERTS, *Primary Examiner.*

UNITED STATES PATENT OFFICE
CERTIFICATE OF CORRECTION

Patent No. 3,414,591                                          December 3, 1968

Harmen van Kamp

It is certified that error appears in the above identified patent and that said Letters Patent are hereby corrected as shown below:

Column 4, line 57, "s.(3q" should read -- S(3) --; line 74, "17-9β,10α" should read -- 17-methyl-9β, 10α --.

Signed and sealed this 7th day of April 1970.

(SEAL)
Attest:

Edward M. Fletcher, Jr.
Attesting Officer

WILLIAM E. SCHUYLER, JR.
Commissioner of Patents